UNITED STATES PATENT OFFICE.

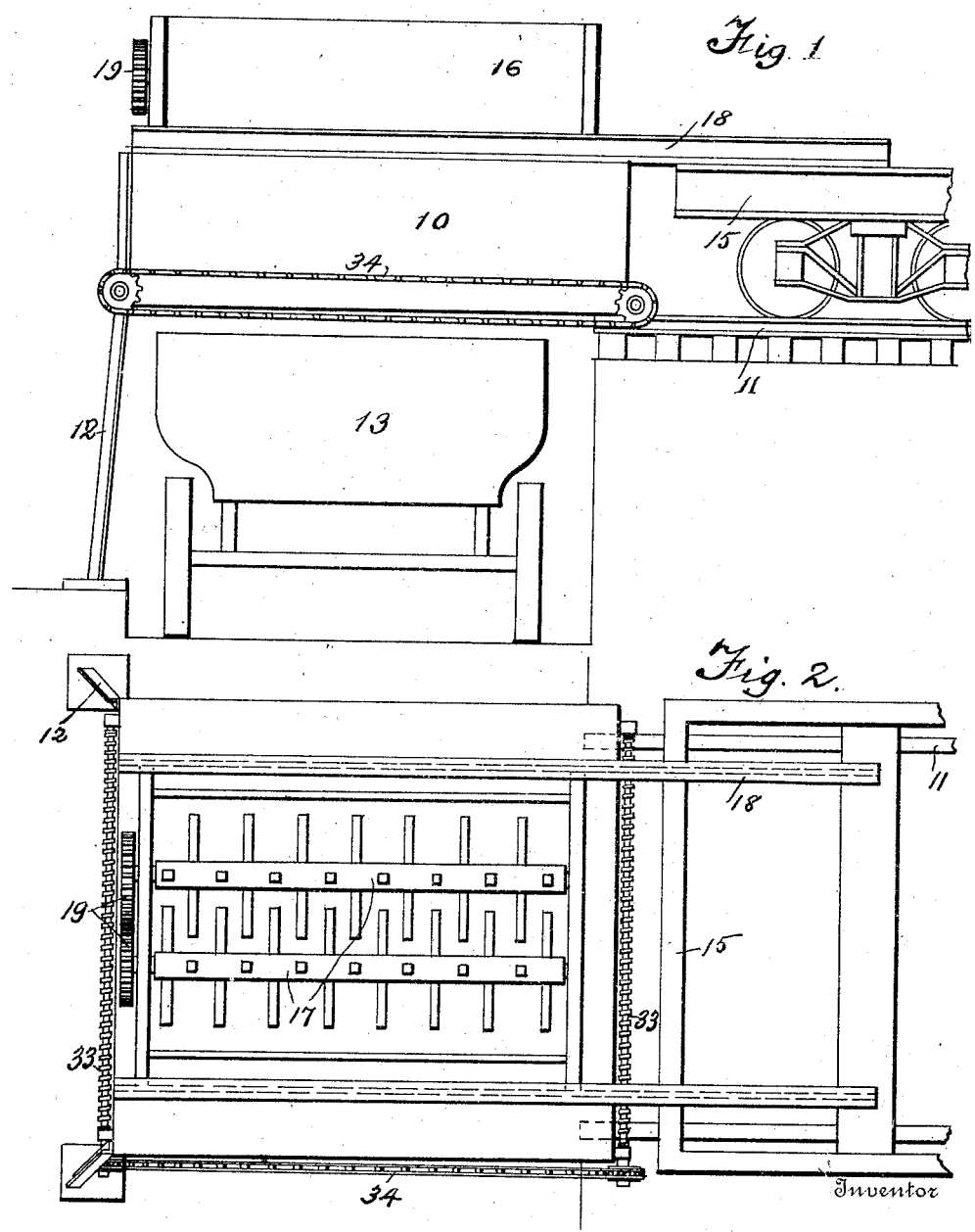

CLIFFORD C. MOSHER, OF LIMA, OHIO.

HOT-MATERIAL STORAGE-BIN.

1,364,400.   Specification of Letters Patent.   Patented Jan. 4, 1921.

Application filed November 8, 1919.   Serial No. 336,685.

*To all whom it may concern:*

Be it known that I, CLIFFORD C. MOSHER, a citizen of the United States, residing at Lima, in the county of Allen and State of Ohio, have invented new and useful Improvements in Hot-Material Storage-Bins, of which the following is a specification.

This invention relates to apparatus for use in laying pavements and the like and, more particularly stated, consists in a storage bin for hot asphaltic mixtures, arranged and adapted to receive and maintain at the proper temperature a plurality of batches from the mixers and to deliver its contents to a wagon or other conveyance of a capacity to receive the same.

The object of the invention is to conserve time and labor. It is customary to load the wagons directly from the mixer and, as a wagon will hold several times the amount of a mixer batch, the wagons are necessarily idle for a considerable part of the time.

The bin, which constitutes the present invention, is in effect a reservoir in which a number of mixer batches are gathered, are mixed while kept hot, and are dumped into the distributing means when the contents are sufficient to fill the latter.

In the accompanying drawings I have illustrated the bin in use in connection with a portable railroad paving plant, but it will be obvious that it may equally well be used in stationary plants, that is be permanently located beneath the mixer, or that the bin itself may be movable, for instance, mounted on wheels, without in any way changing its essential construction and utility.

Figure 1 is a side elevation of the bin in use, showing the mixer in position above the bin and a wagon in position beneath same.

Fig. 2 is a plan view of Fig. 1.

Figure 3:
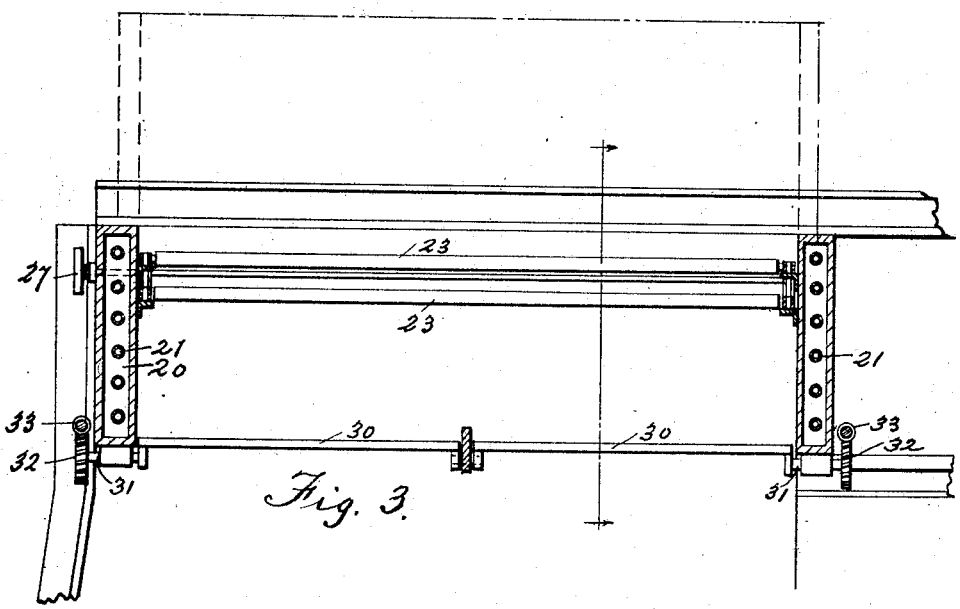
Fig. 3 is a longitudinal section of the bin.
Figure 4:
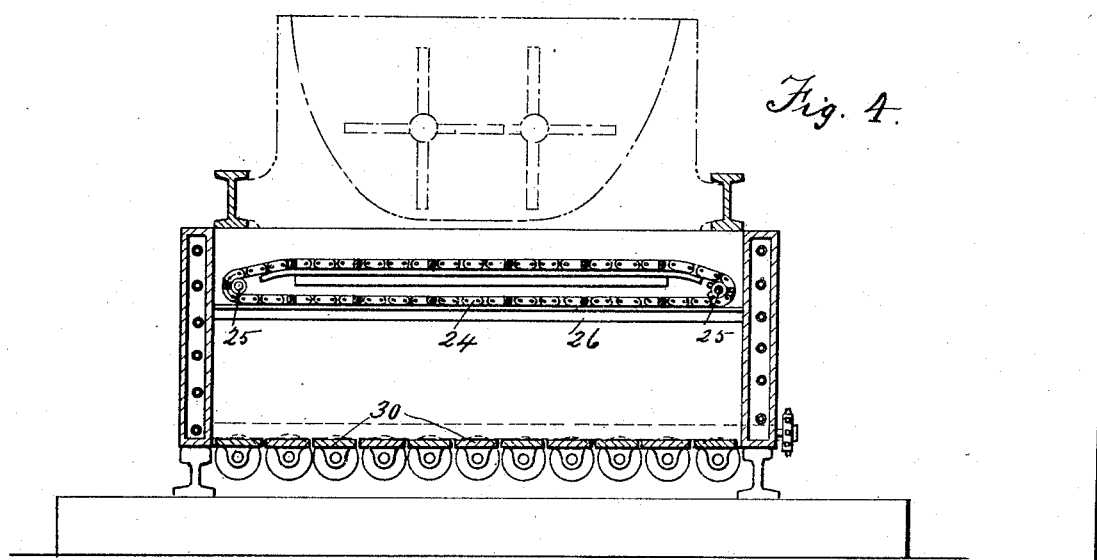
Fig. 4 is a cross section of the same on line 4—4 of Fig. 3.

10 is the storage bin or reservoir, supported at one side on the end of the railroad track 11 and at the other on standards 12, thus forming a bridge over the roadway on which the wagon 13 is driven under the bin. 16 represents the mixer mounted on the rails 18 carried by the truck 15, which runs on the track 11. The mixer may be of any desired type and is conventionally illustrated as equipped with agitator blades 17 driven by gears 19.

The sides 20 of the bin are double walled or jacketed and contain steam coils 21. The bottom is composed of a plurality of slats or leaves 30, carried by trunnions 31, on the outer ends of which are carried worm wheels 32, simultaneously operated by a long worm 33 extending along the sides of the bin, the two worms being connected by a sprocket chain 34, driven in any suitable way.

To level the material in the bin, a chain 24 is mounted on sprockets 25 at each side of the bin, tracks 26 being provided for the two bights of the chain to slide on, and bars 23 extend from one chain to the other across the bin; means, as the wheel 27, are provided on the outside of the bin to actuate the chains.

In operation, the bin receives the charges from a plurality of mixers, or a plurality of charges from a mixer, the material is spread evenly by the bars 23 and, when a wagon-load has been collected and is at the right temperature determined by the steam in the coils 21, the whole contents of the bin is dumped into a waiting wagon by rotating the bottom leaves 30.

Having thus described my invention, what I claim is:

1. A reservoir or collecting bin for hot asphaltic mixtures, comprising a rectangular box and means to support the same over a roadway, the bottom of said box being composed of a plurality of pivoted leaves and equipped with means to simultaneously rotate the same, means to heat the walls of said box, and means to spread the material evenly therein.

2. A storage bin for hot asphaltic mixtures of a capacity to hold a plurality of mixer batches, means to discharge said batches into the bin, means to spread them evenly therein, means to heat the walls of the bin, and means to discharge the whole contents of the bin at one time into a waiting wagon or the like.

In testimony whereof I have hereunto set my hand.

CLIFFORD C. MOSHER.